United States Patent
Alexander

[15] 3,685,357
[45] Aug. 22, 1972

[54] SENSOR RESPONSIVE TO LIQUID LEVEL

[72] Inventor: Alexander W. Alexander, 1108 Kinloch Lane, North Vancouver, British Columbia, Canada

[22] Filed: Jan. 26, 1970

[21] Appl. No.: 5,561

[52] U.S. Cl. ................ 73/313, 73/DIG. 5, 200/84 C
[51] Int. Cl. ............................................. G01f 23/12
[58] Field of Search....73/313; 200/84 C; 340/244 A; 317/155, DIG. 2, DIG. 3, 155

[56] References Cited

UNITED STATES PATENTS

| 3,412,292 | 11/1968 | Forbes | 317/DIG. 3 |
| 3,324,319 | 6/1967 | Sleeter | 317/155 UX |
| 3,437,771 | 4/1969 | Nusbaum | 200/84 C |
| 3,408,053 | 10/1968 | Vantroba | 200/84 C |
| 3,506,883 | 4/1970 | Sugiyama | 317/154 |
| 3,264,627 | 8/1966 | Austin | 340/244 A |
| 3,200,645 | 8/1965 | Levins | 73/313 |
| 3,131,335 | 4/1964 | Berglund et al. | 317/148.5 |

Primary Examiner—Louis R. Prince
Assistant Examiner—Daniel M. Yasich
Attorney—Lyle G. Trorey

[57] ABSTRACT

A sensor responsive to a liquid level in a container wherein a sealed tube having longitudinally spaced apart, magnetically actuated switches, enclosed therein, is disposed vertically of the container. The switches are actuated by a magnetic float sensitive to changes in liquid level slidably mounted on the tube for vertical movement.

4 Claims, 12 Drawing Figures

PATENTED AUG 22 1972

Alexander W. Alexander,
Inventor by

Lyle C. Trorey,
Agent

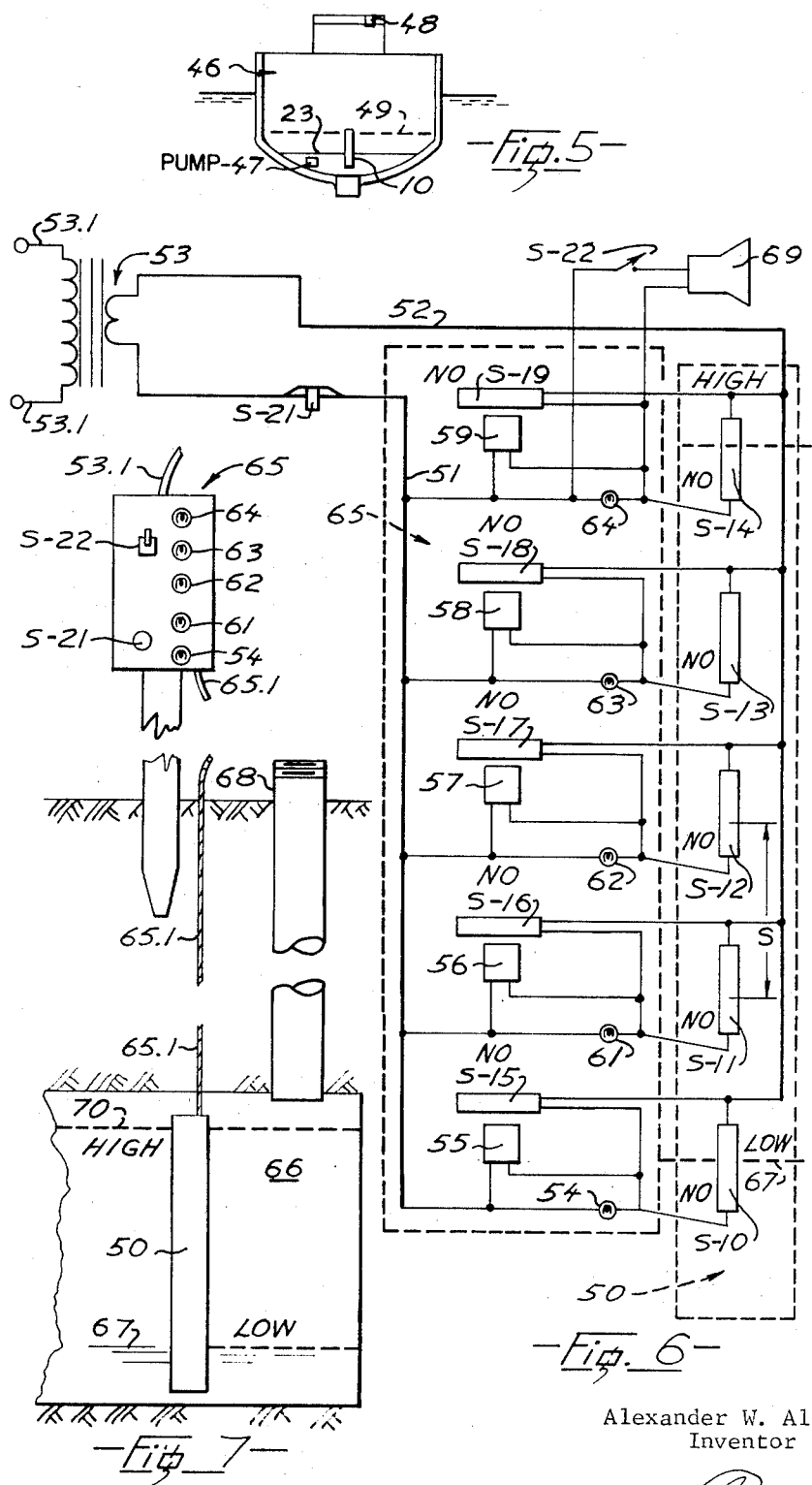

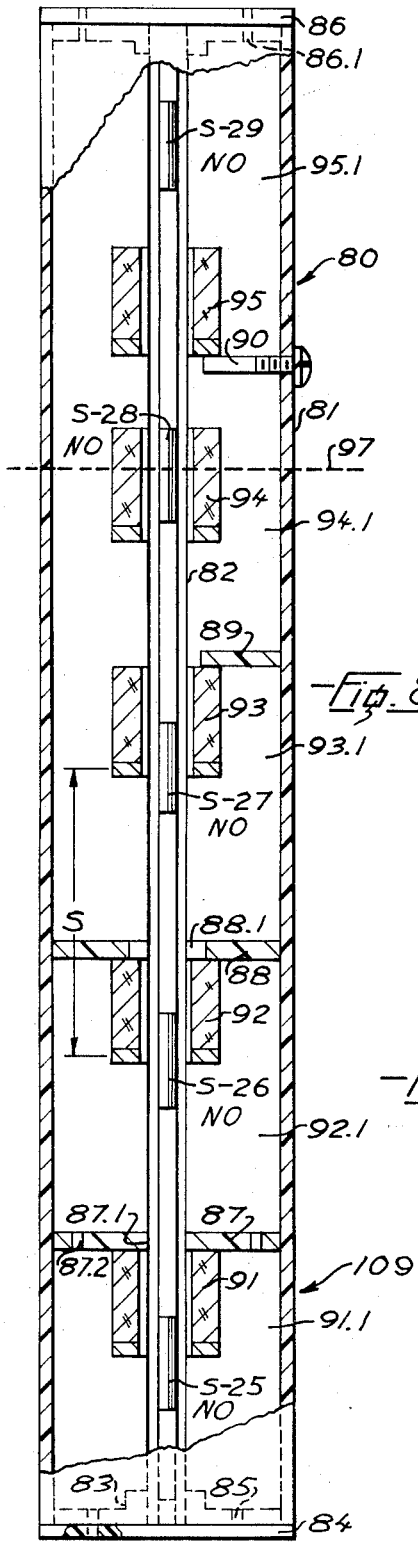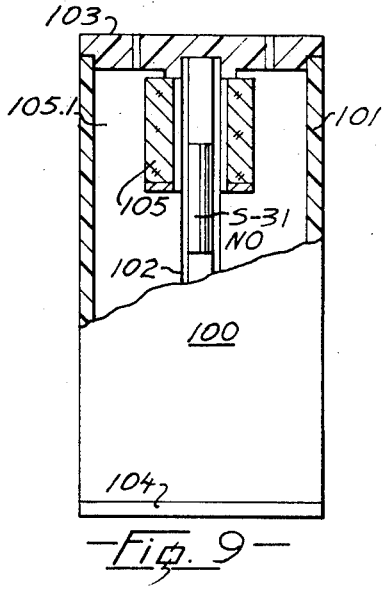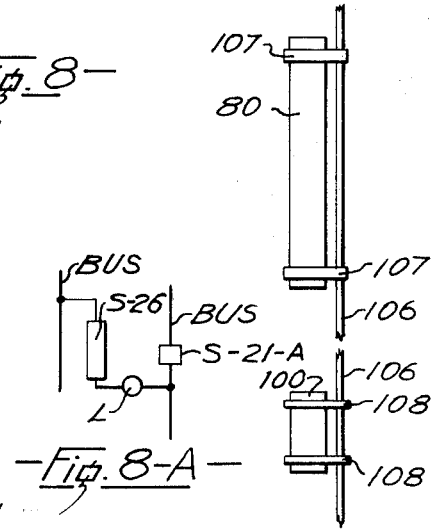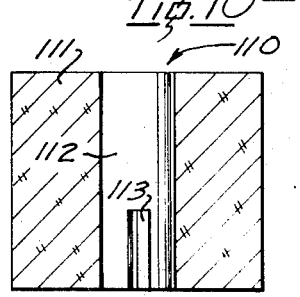

SENSOR RESPONSIVE TO LIQUID LEVEL

BACKGROUND OF THE INVENTION

1. Field of the Invention

The invention relates to a sensor assembly, and associated electrical circuitry, constructed and arranged, for instance, to activate a bilge pump of a ship when bilge water reaches a particular pre-determined level, the sensing device not being restricted thereto but being also adapted, with suitable circuitry, to determine whether liquid in a tank or other container is within pre-determinate limits. It is particularly adapted for use with flammable liquids.

2. Prior Art

There are a number of means known to indicate liquid level either continuously or at discrete intervals and, associated with such means, either to replenish or to replenish and to reduce the level of the liquid.

These means generally include vertically spaced floats in a tank the floats being spaced at pre-determined upper and lower levels; pressure-operated switches activated by hydrostatic head; where the liquid is an electrolyte, spaced probes can be used, the probes being adapted so that changes in resistance between adjacent probes caused by presence of the liquid alters electrical resistance between them, so altering bias of a thermionic tube or of a transistor.

A level controller of this latter kind is taught in the U.S. Pat, No. 3,131,335 issued in 1964 to Berglund et al.

U.S. Pat. No. 3,333,258 issued to Walker et al., in 1967 teaches a fool proof system for sensing both normal and abnormal conditions. This invention utilizes solid state sensing circuitry for detecting presence of an electrically conducting liquid.

U.S. Pat. No. 3,340,892 issued to Hollhand in 1967 teaches electronic detection and control systems for detecting changes in resistance of an element, and is particularly related to apparatus for indicating and/or controlling level of electrically conductive materials.

The present invention is directed particularly to automatic activation of a bilge pump of a ship when bilge water exceeds a pre-determined level, also to providing in one embodiment emergency warning when the bilge water exceeds a danger level — caused either by failure of the bilge pump or inability of the pump to prevent water level continuing to rise until the danger level is reached. The invention is also adapted for indicating progressively at discrete intervals, level of a liquid such as gasoline or fuel oil, in a tank. Utility of the present invention extends beyond the examples above as becomes apparent later herein.

OUTLINE OF THE INVENTION

The present invention includes a sensor assembly having at least two vertically spaced magnetic reed switches. Magnetic switches of this kind are well known being obtainable from, for instance, Canadian General Electric at Toronto, and from General Electric international outlets.

The reed switches are encapsulated in glass and are further protected, consequently fire hazard from exposed switch contacts is minimal.

The reed switches are sealed in a vertically disposed tube, the tube being itself sealed at at least a lower end to prevent liquid entering the tube. A magnetic float, suitably a thick hollow cylinder having an inside diameter somewhat larger than the tube so as to be slideable thereon, moves upwards of the tube floating on the liquid. A lower switch of the reed switches is adapted so that, at a pre-determined lower level of the liquid, the magnetic float is positioned adjacent to the lower reed switch which then responds to a magnet of the float. Thus, as the liquid level rises, the float rises on the tube so that the reed switch is no longer responsive to the magnet, and activates a latching means of a latching relay through suitable circuitry. As the water level increases the float rises to a second of the two reed switches, so that the second switch responds to the magnet. The second switch is connected so that, for example in an installation in a bilge of a ship, a bilge pump motor is then energized driving a bilge pump. A latching relay of a known kind is used in conjunction with the reed switches, the latching relay being constructed and arranged so that when the lower reed switch is uninfluenced by the magnet as aforesaid, a latch means of the relay is activated.

When the float rises to the pre-determined level above whereat the second reed switch becomes responsive to the magnet, a power coil of the relay closes and latches power contacts so that a power output line to the pump is energized so operating the pump. Normally, operation of the pump reduces level of the water so that the float sinks and the upper switch is no longer influenced by the magnet. Because of the latching means aforesaid the power contacts remain closed and the pump contacts remain closed and the pump continues to operate until or unless the water level falls to such position that the magnet of the float influences the lower reed switch. When this occurs, the latching means is released so that the power contacts open stopping the pump.

A further reed switch can be provided at an arbitrary, or high, danger level. If, notwithstanding that the pump is operating or if the pump be disabled, water continues to rise until the magnetic float influences the danger level reed switch, an audio or audio-visual emergency signal is activated providing danger warning.

A further example of use of the sensing device with two, or with a plurality of, vertically spaced reed switches is progressively to indicate level in a fuel tank being filled. The sensing device, which is totally enclosed with respect to electrical parts, is particularly advantageous in dealing with flammable liquids.

The sensor assembly itself, and the sensor assembly in combination with the electrical circuitry described, not only distinguishes over prior art known to the present inventor and adapted generally to achieve his objects, but also is simple in electrical and mechanical construction being cheap to manufacture and assemble.

A detailed description following related to drawings gives exemplification of preferred embodiment of the invention which, however, is capable of expression in a structure other than that particularly described and illustrated.

DESCRIPTION OF THE DRAWINGS

FIG. 5 is a diagram showing the liquid level indicator in a bilge of a ship, FIG. 6 is a schematic showing wiring of a further embodiment of the sensor assembly, FIG. 7 shows the FIG. 6 liquid level indicator embodiment in a fuel tank, FIG. 8 is a part sectioned elevation of a still further sensor embodiment, FIG. 8-A is a schematic illustrating wiring of the FIG. 8 sensor, FIG. 9 is a multi-element sensor embodiment with alternative latching means, FIG. 10 shows a single element sensor, FIG. 11 is an alternate magnetic float.

All of the figures and diagrammatic. Normally closed and normally open switches are referred to as NC and NO respectively.

DETAILED DESCRIPTION

Figure 1:
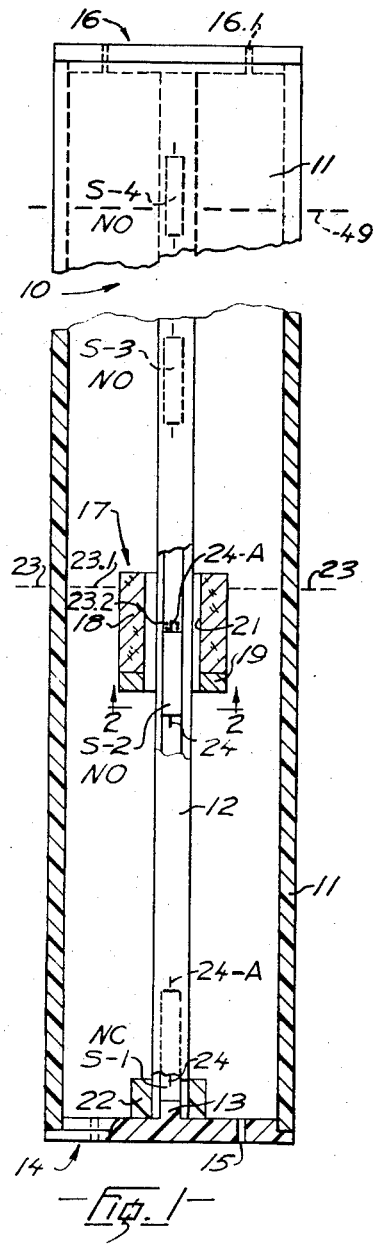
FIG. 1 is a part sectioned elevation of a sensor assembly of a liquid level sensing apparatus according to the invention.
Figure 2:
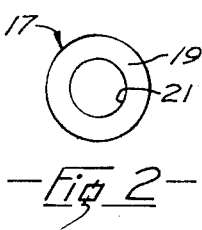
FIG. 2 is an end elevation of a magnetic float seen from 2—2 FIG. 1.

FIGS. 1 and 2

In FIG. 1 a sensor assembly is designated 10. The assembly has an outer tube 11, and an inner tube 12 supported centrally within the outer tube. A central boss 13 of a lower cap 14 has an outside diameter such as to be accepted internally of the inner tube 12, the cap having openings 15 for liquid to enter a space annular in section defined between the inner and outer tubes. An upper cap 16 is as described with reference to the lower cap, the caps and outer tube 11 being constructed and arranged so that the inner tube is centrally supported within the outer tube when the caps are in place. Openings 16.1 of the upper cap 16 permit escape of air displaced by the entering liquid. Switches S-1 through S-4 are magnetic proximity, or reed, switches later particularized. S-1 designated NC is a normally closed switch, and S-2, S-3, S-4, designated NO are normally open reed switches. The switch S-1 is secured within the inner tube 12 near a lower end so that, when assembled as shown in FIG. 1, it is just clear of the central boss 13. S-1 is a low level switch.

The sensor assembly is disposed vertically, and the switches S-2, S-3, S-4, are spaced at intervals later described. The inner tube has an inside diameter sufficient to accept the switches and wiring of the switches (wiring is not shown in FIG. 1) and, in assembling the switches to the inner tube, they are secured by means of an adhesive. The inner tube 12 is secured to the boss 13 so as to make a liquid tight joint so that liquid cannot enter the inner tube at the joint. It is not necessary that the inner tube be secured to the upper cap 16 by a liquid tight joint but generally, and particularly in circumstances later described, this joint, too, is liquid tight.

A magnetic float 17 has a buoyant body 18, and an annular permanent magnet 19 is secured to a lower end of the buoyant body. The float shown is a short hollow cylinder, inner side walls 21 of which define a central opening having a diameter such that the float is slideable freely of the inner rod 12, the annular magnet having a central opening of the same diameter. Downward motion is limited by a stop 22 secured to the lower cap 14 as shown.

In FIG. 1 the sensor assembly 10 is shown disposed of vertically within a liquid level of which is to be indicated. The magnetic switches have contacts generally mid-way between upper and lower ends. When the liquid is at an outer level indicated at 23—23 FIG. 1, it will have entered the outer tube through the lower cap openings 15 and reached an inner level 23.1 corresponding to the outer level 23—23, with the magnetic float floating in a position shown. In this position, the magnet 19 closes the normally open switch S-2.

The body 18 of the float 17 has a buoyancy such that, taking into consideration specific gravity of the liquid being measured, the body with the magnet can float as indicated in the liquid.

With no liquid in the outer tube 11, the float assumes a lowest position at which the magnet 19 rests on the stop 22, this position being such that the normally closed switch S-1 is open when the magnet rests on the stop.

Fluid Tight Joints of Inner Tube; Materials

With a fluid tight joint between the inner tube 12 and the boss 13 of the lower cap 14, it is seen that liquid cannot enter the inner tube until or unless it rises to the upper cap 16 when it could leak down the tube if the joint between the tube 12 and the upper 16 were not liquid tight. With liquid level below the upper cap, vapor from the liquid could enter and might be harmful. For this reason it is well to seal the joint to the cap 16 also. A quantity of hygroscopic material 23.2 can be placed within the inner tube between the switches before sealing. In marine applications for indicating depth of water in a hold, a marine sealant, e.g., epoxy, is used.

With other liquids, a sealant is used which will not interact (to material extent) with the liquid. Joints of the caps 14 and 16 need not be liquid or air tight, push fit is satisfactory with both upper and lower ends of the central tube secured. With both ends of the central tube 12 sealed, any adhesive which does not tend to corrode electrical wiring can be used to secure the switches within the tube.

The outer tube and the caps can be any material which will not interact with the fluid being measured, the material usually being non-magnetic. An outer tube of, e.g., galvanized iron pipe can be used of inside diameter sufficiently large so that free travel of the magnetic float is not impeded. The inner tube can be of a non-magnetic metal, for instance copper. Consequently it is specified the inner tube be of non-magnetic material meaning that any material which permits the float magnet to activate the reed switches can be used. Boiler gauge glass is suitable both for inner and outer tubes, but with glass there is danger of breakage. Suitable high impact plastics are readily available as is well known in the art, and it is convenient that both tubes be transparent so as to facilitate inspection.

The float body can be impregnated cork, with the magnet obviously secured thereto. Polystyrene cut to required shape and impregnated with common insulating varnish is readily available and has indefinite life. The permanent magnet can be of solid magnetic material of high remanence and coersive force, or can be of bonded powdered magnetic material. A bar magnet alternative is shown in FIG. 2-A, later described.

FIG. 3

Figure 3:
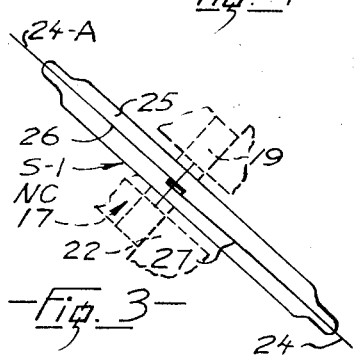
FIG. 3 shows an NC magnetic switch.

The normally closed switch S-1, shown in FIG. 3 is, as aforesaid, a magnetic proximity or reed switch and has terminal lugs 24, 24-A, extending outwards from opposite ends of a transparent body 25 having internal contact arms 26 and 27. Such switches are hermetically sealed, have precious metal contacts, and have an indefinite life. They are available from ordinary supply sources.

The magnet 19 of the magnetic float 17 is shown in FIG. 3 in broken outline in a position central of the transparent body 25 the magnet being in the lowermost position against the stop 22. In the broken outline position the normally closed contacts would open. The switch is some 3.2 inches long, consequently for the magnet 19 to be in the position shown in FIG. 3, (see now FIG. 1) the block 22 has such height as to effect this including clearance for the lug 24.

Figure 4:
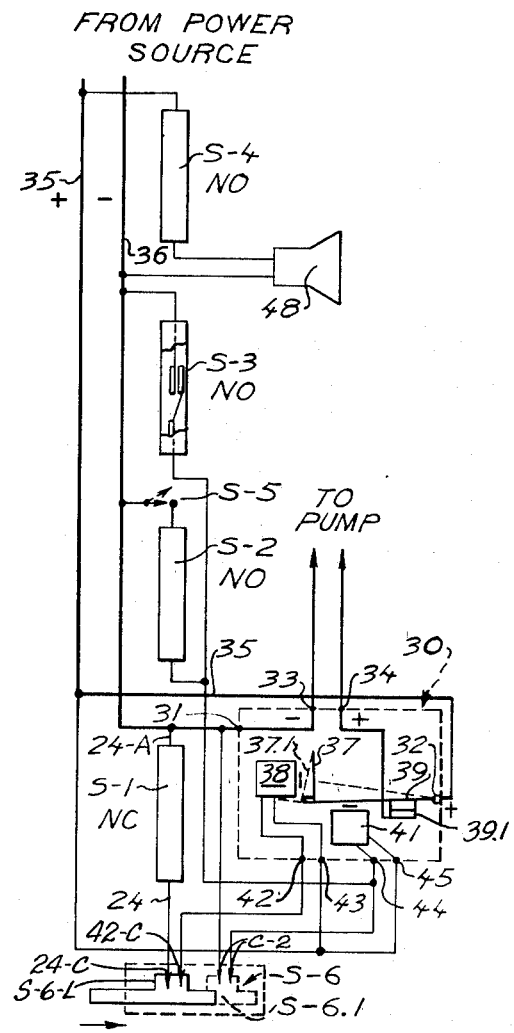
FIG. 4 is a schematic showing wiring of the sensor assembly, and connection to external circuits.

Electrical Connections, FIG. 4

FIG. 4 shows schematically electrical connections of the sensor assembly, and connection to external circuits.

A latching relay 30 has negative and positive power input terminals 31 and 32, and negative and positive power output terminals 33 and 34 which, in a ship installation, are connected to an electrical bilge pump shown in FIG. 5 only. A positive (+) bus 35 is connected to the terminal 32 as shown, and a negative (−) bus 36 is connected to the negative power input terminal 31 as shown. The buses lead from a power source not shown.

A latching means, shown in a full line latching position designated 37, is operated by a latching coil 38, and power contacts 39 and 39.1 are closed when a power coil 41 is energized, closed and open positions being respectively designated at 39 (solid line) and the broken line. The latching and power coils are connected to latching coil and power coil terminals 42, 43, and 44, 45, as shown. When the latching coil is energized the latching means 37 assumes a broken outline position 37.1, upon de-energizing the coil the latching means resumes the full line latching position 37. This occurs when the float rises so that the NC reed switch S-1 FIG. 1, opens. Upon the water rising to the level 23.1 FIG. 1 the float 17 rises to the FIG. 1 position and the NO switch S-2 closes, energizing the power coil 41 and closing the power contacts 39 — solid line position. The power output terminals are now energized. The latching means 37 being in the solid line latching position 37 it is seen that, notwithstanding the power coil would become de-energized by fall of water level below the level 23.1 FIG. 1 opening S-2, the power contacts remain closed being held in that position by the latch means. When the latching coil is energized by the float magnet reaching its lowest position against the stop 22, FIG. 1 the latch moves to the broken outline position 37.1 so opening the power contacts 39 and stopping the pump. Latching relays effecting the above are common trade articles.

OPERATION

FIG. 5 is a diagram showing the sensor assembly installed in a bilge of a ship 46, the power terminals 33, 34, being connected to the bilge pump designated 47 in FIG. 5 only. With water in the bilge rising to the level 23 (FIGS. 1 and 5) the power output terminals of the relay become energized and, with these terminals connected to the electrical bilge pump 47, the pump starts.

It is seen that the pump will continue to run until, or unless, the water level is reduced to a position at which the magnet 19 of the magnetic float 17 resumes the lowermost position shown in broken outline in FIG. 3.

An isolating switch S-5 FIG. 4 disconnects the reed switch S-2 from the negative bus 36. The reed switch S-3 is connected as described with reference to S-2 except for the isolating switch. With the isolating switch S-5 open, closing of the NO reed switch S-2 will not effect operation of the pump at the level 23—23 since S-2 is not then in circuit. The pump will however start with S-5 open, and continue to run as aforesaid, when water rises a height such that the flat closes the NO reed switch S-3.

The reed switch S-4 is at a position above the reed switch S-3. Should the pump fail to operate or be unable to prevent increase of water in the bilge, at attaining of such higher water level as to close the normally open reed switch S-4, a signal means 48, FIGS. 4 and 5, is activated, the reed switch S-4 being connected across the positive and negative buses in series with the signal means. The signal means 46 thus provides emergency warning that water has risen to a danger level 49, FIGS. 1 and 5, sufficient to close the switch S-4. The emergency signal means 48 can be an audio signal as indicated, or a visual signal such as for instance a flashing red light, or both.

S-6

A slide switch S-6, FIG. 4 is a test and independent start means operating as follows. S-6 has a lug S-6-L cooperating with a spaced slide contact pair 24-C, 42-C being connected as shown. A slide is in a full outline position shown in which the lug 24 of the NC reed switch S-1 is connected to the latching relay terminal 42 as before stated, the slide switch has contact spacing such that the S-1 circuit is open before the power coil circuit is made as is later described. A second spaced pair of contacts, C-2 is engaged by the lug in a broken outline position S-6.1.

To test when the pump is not running, as the slide is moved to the broken outline position S-6.1, the NC S-1 switch circuit is broken so that, whether S-1 is closed or open the relay coil 38 is de-energized and the latch of the relay 30 would have moved from the broken outline position 37.1 towards the full line position 37. At the broken outline position S-6.1 the negative bus 36 is connected to the power coil relay terminal 44 (the positive bus remaining connected to the terminal 45) so that the power coil is energized, starting the pump if circuitry is in order, and latching it on since S-1 is effectively open.

When the slide resumes the full line position, the power coil is de-energized, but, the relay being latched on, the pump will not stop unless or until S-1 closes. Thus the switch S-6 can be used independently to start the pump when the float is above the NC reed switch S-1, but not by an amount sufficient to close the NO reed switch S-2 or as the case might be and, as well, to start the pump if the NC switch S-1 is closed.

If the pump is running, S-1 is open — the power coil 41 may or may not be energized. It is seen then that operation of S-6 with the pump running will, if the power coil is energized, have no effect. If it is not energized the power contacts 39 are latched closed — and will remain latched closed until the water level reduces sufficiently to open S-1.

FURTHER EMBODIMENT

FIG. 6

In FIG. 6, a sensor 50 indicated in broken outline has vertically spaced normally open magnetic proximity or reed switches S-10 through S-14, connections being as shown. S-10 is a low level switch, and S-14 a high level switch. The sensor 50 differs from the sensor 10 FIG. 1 in number of reed switches, in that the low level reed switch S-10 is spaced from the lower cap, and in that all the reed switches are normally open. Otherwise, the sensor can be as described with reference to the sensor 10, FIG. 1. Only the reed switches S-10 through S-14 and their connections are shown in the sensor 50, FIG. 6.

As is later explained, the sensor 50 is vertically disposed within a tank levels of liquid in which are to be indicated. Levels intermediate between low and high are indicated by means including intermediate reed switches, namely the reed switches S-11, 12, 13.

When the sensor is to be used with a 110 or 220 AC line, a step down transformer 53 is used having a primary connected to an AC line 53.1. Power buses 51, 52, are connected to low voltage secondary output terminals of the transformer. The low level switch S-10 and a signal, viz, a light 54 are in series across the law voltage buses so that, when the NO switch S-10 closes, the light 54 comes on. An electromagnet 55 is shunted across the light 54, and thus is energized when the switch S-10 closes. A further normally open magnetic proximity switch S-15 is shunted across the switch S-10. The NO switch S-15 is closed when the electromagnet 55 is energized, and remains closed so long as it continues to be energized. When the low level switch S-10 opens after closing as aforesaid, it is seen that, notwithstanding S-10 is open, the electromagnet remains energized holding the switch S-15 closed. A spring return pushbutton switch S-21 in a bus, shown in FIG. 6 in the bus 51 ahead of the sensor and ahead of all of the switching means, is provided. When S-21 is pressed to open, the light S-54 goes out, the electromagnet 55 is de-energized, and the NO switch S-15 opens. The NO switch S-15 is thus a latching switch, and S-21 is a means to unlatch. Upon releasing the switch S-21 power is restored to the bus but, unless the NO low switch S-10 is closed, the light 54 remains off. NO latching switches S-16 through S-19, electromagnets 56–59 and signal lights 61–64 are provided associated respectively with the intermediate switches S-11 through S-13 and the high level switch S-14, being connected shown in FIG. 6, and as described above with reference to the low level switch S-10.

A combination including an electro-magnet as the coil 55 and a magnetic proximity switch as the switch S-15, is hereinafter referred to as means to effect latching as is the latching relay 30 FIG. 1.

The transformer, the magnetic latching means and the signal lights 54 and 61–64 are housed in a container indicated in broken outline and designated generally 65. Particularly for use in fuel tanks, low level supply is used. The transformer can have a 12, or 6 volt, or even lower output and the lights 54 and 61–64 are according to the low voltage as are the electromagnets 55–59.

FIGS. 6 and 7

FIG. 7 shows the container 65 and the sensor 50 vertically disposed within a buried fuel tank 66. Connections from the sensor 50 to the container 61 are by a multiconductor cable 65.1, properly protected where it passes underground to the sensor 50.

The tank contains fuel at a low level 67, which low level is also indicated in FIG. 6. As has been stated, the sensor 50 is generally similar to the sensor assembly 10 FIG. 1 and also has a magnetic float 17, not shown in FIGS. 6 and 7. With the fuel in the tank at the low level 67, the magnetic float of the sensor 50 is in the same position with respect to the low switch S-10 FIG. 6, as that in which the float 22 is shown in FIG. 3 with respect to the switch S-1, that is to say at the low fuel level, the S-10 being a normally open switch is closed, and the light 54 is on.

An operator introduces fuel into the tank 66 through a filler 68. As the tank fills fuel level rises, and it is clear that the signal lights 61, 62, 63, will light successively with the light 64 going on at a high level 70, FIGS. 6 and 7.

In FIG. 6 an auxiliary signal means 69, for instance an audio signal device such as a horn or bell, is shunted across the signal light 64 indicating the high level, and is controlled by a switch S-22.

Usually the signal lights 54 and 61–64 are seen as the tank is being filled, but circumstances can arise in which the signal lights might not be being closely observed. The means 69 giving an audio signal well above anticipated ambient noise level, the signal will sound when the high level is reached.

Note that the high level 70 indicates that the tank is nearly full, not at an overflow level. Thus the operator has warning in advance of overflow. Automatic shut-off is often provided in which case the signal means need not be used. However automatic shutoffs sometimes fail to act, accordingly with provision as above danger of accidental overfilling, with or without automatic shutoff, is minimal. The switch S-22 controls the signal 69 so that it can be turned off without cancelling the signal lights. As described, pressing of the switch S-21 will cancel all lights unless the float happens to be in a position such that, for instance the switch S-14 is closed by the float — this would occur had the tank just been filled.

STILL FURTHER SENSOR EMBODIMENT

FIGS. 8 and 8-A

The embodiment last described above indicates at least an approximate level of fluid in the tank when the tank has just been filled or, when the float is in a position to close one of the magnetic reed switches.

The further embodiment shown in FIG. 8 is constructed and arranged continuously to show level in the tank within discrete intervals.

A sensor assembly generally 80 has an outer tube 81 and inner tube 82, the inner tube being secured on a central boss 83 of a lower cap 84 having openings 85. An upper cap 86 has openings 86.1 an upper end of the inner tube 82 being secured in the upper cap as described with reference to the lower cap. All of the foregoing are substantially as described with reference to the sensor 10 FIG. 1.

Magnetic reed switches S-25 through S-29 are disposed within the inner tube 82 spaced apart from center to center by a distance S as shown, all are NO (normally open) types. Members 87 through 90 extend transversely of the sensor within the outer tube 81. Magnetic floats 91 through 95 are as before described with reference to the magnetic float 17 FIGS. 1 and 2. Vertical travel of the magnetic float 91 is confined within a space 91.1 defined by the lower cap 84 and the member 87. Vertical travel of each of the magnetic floats 92 through 94 is confined respectively within spaces 92.1 through 94.1 defined within the sensor by the transverse members 87 through 90, and the magnetic float 95 is confined to vertical travel within an upper space 95.1, defined by the member 90 and the upper cap 86. The members 87 through 90 are positioned so that when a space, for instance the space 91.1, is filled with liquid the float 91 (being at an upper limit of its travel) is in a position such that the normally open reed switch S-25 is closed, this switch being opened when the float 91 is at a lower limit of its motion resting against the lower cap central boss 83. Each reed switch is connected in series with a lamp L across buses B, as shown with respect to the switch S-26 only, in FIG. 8-A.

The Transverse Members 87 Through 90

The transverse member 87 is shown as a disc with a central opening 87.1 to receive the inner tube 82, and with openings 87.2 for passage of liquid from the space 91.1 to the space 91.2. This construction provides additional central support for the inner tube. The transverse element 88 is annular having a central opening 88.1 of inside diameter less than that of the float.

The transverse member 89 is a finger secured in the outer tube 81 and extending nearly to the central tube 82, so as to limit upward travel of the float 93 as before explained. The transverse member 90 is a screw extending radially through the outer tube 81 nearly to the inner tube 82 so as to provide a stop for the floats 94 and 95. Note particularly that leakage through the outer tube 81 is of no consequence, and that therefore sealing is not required.

All of the above are exemplifications of means to limit vertical travel of a float within discrete limits. When the sensor 80 is long, inclusion of at least one transverse member as the transverse member 87 provides additional rigidity, and particularly additional support for the inner tube.

OPERATION OF THE FIG. 8 SENSOR

The sensor 80 is disposed within a tank as described with reference to FIG. 7, with connections being as indicated in FIG. 8-A. The lamps, a low voltage transformer, and manual switches, are in a container similar to the container 65. With liquid at an intermediate level 97, FIG. 8, the floats 91, 92, 93, are each at the upper limit of travel so that the normally open reed switches S-25, S-26, S-27 are closed and accordingly the lights associated with each are on.

Since each of these floats remains at its upper limit so long as the corresponding spaces are filled with liquid, it is seen that the FIG. 8 embodiment does not require the means to effect latching exemplified in FIG. 6, or the latching relay 30 FIG. 1, but uses the means described and illustrated with reference to FIGS. 8 and 8-A to effect latching.

Referring to the float 94, this is shown in FIG. 8 floating in liquid at the level 97. In this position the normally open reed switch S-28 is not yet responsive to the magnet of the float 94. It is seen then that the signal lights give an indication that liquid is at or above the member 89, but below the member 90.

The switch S-21 FIGS. 6 and 7 has been described as being normally on. In the FIG. 8 embodiment, a toggle switch or a normally off push button switch is substituted for the switch 21 so that indication of fuel level is given only when this switch is on. This is shown as S-21-A in FIG. 8-A.

A Single Element Sensor, FIG. 9

A single element sensor generally 100 is shown in FIG. 9, the sensor having an outer tube 101, an inner tube 102, upper and lower caps 103, 104 both caps including openings, a normally open magnetic reed switch S-31, and a magnetic float 105. The float can travel vertically within a space 105-1 upper and lower limits of which are respectively defined by the upper and lower caps. With the float in the upper position as shown, the normally off magnetic reed switch S-31 is closed by the magnet of the magnetic float 105. S-31 is connected as before described with reference to the switches S-25 through S-29 FIG. 8, having a lamp in its circuit.

FIG. 10

FIG. 10 shows a sensor 80 as FIG. 8 secured to a vertical member 106 by clamps 107, and a single element sensor as the sensor 100 FIG. 9 is also secured to the vertical member 106 by clamps 108, spacing it below the sensor 80. The vertical member 106 with the sensors attached is installed, for instance, within a tank containing liquid level of which is to be gauged.

Referring now to FIG. 8 an assembly of lower portions of the inner and outer tubes, the switch S-25 the magnetic float 91, the lower cap 84 and the member 87 is collectively designated 109. It is seen that a configuration according to FIG. 10 effectively separates the assembly 109 from the remaining elements of the sensor 80.

Depending upon what information is required, positions of the single element sensor and the sensor 80, a multi-element sensor, can be reversed. Alternatively, two single element sensors can be used giving only information, for instance, as to an upper level and a lower level.

It is apparent that other combinations of the several sensors herein described and illustrated can be used according to circumstances.

FIG. 11, Alternate Magnetic Float

An alternative magnetic float designated generally 110 is shown in FIG. 11. This float has a thick hollow cylindrical buoyant body 111 as before described with reference to the magnetic float 17 FIG. 1, with an inner wall 112 in which a length of bar magnet 113 is secured as shown together with a diametrically opposite similarly mounted bar magnet not seen in FIG. 11. While an operative magnetic float could have only one bar magnet, so that the float floats upright two opposed bar magnets are ordinarily used. Bar magnet magnetic float means can include any arrangement of bar magnets such that the float floats sufficiently nearly upright that vertical travel is not impeded.

I claim:

1. Apparatus including a sensor assembly (10) and associated electrical circuitry the sensor being responsive to level of a liquid, the apparatus including in combination,
   a. float means (17) having a buoyancy such that it floats in the liquid,
   b. means (e.g., S-2) responsive to proximity to the float means adapted to energize an electrical circuit,
   c. pump means (47) to lower the level of the liquid, the pump being activated by the energized electric circuit,
   d. latching relay means (30), in the electrical circuit, adapted to be latched when the circuit is energized,
   constructed and arranged so that rise of the liquid from a low level to a particular higher level (23.1; 67) having effected proximity energizing the circuit as aforesaid, the latching means causes the circuit to remain energized,
   e. and means to unlatch the latching means so as to de-energize the electrical circuit,
   and wherein; the sensor assembly has at least one float,
   a. i. the float being a magnetic float having a magnet,
   b. i. the means (b) responsive to proximity to the float including at least one magnetic switch responsive to proximity to the magnet of the magnetic float;
   the sensor assembly being further characterized by
   f. an inner tube (12) having a lower end,
   g. a low level magnetic switch (S-1) secured within the inner tube near its lower end,
   h. the magnetic float having a central opening so as to be slidable of the tube, and means to limit downward motion of the float to a lowest position with respect to the tube,
   constructed and arranged so that in the lowest position the NC switch is opened by proximity to the magnet of the magnetic float, closing when the liquid, and with it the float, rises to a level at which the low level switch ceases to respond to the magnet,
   i. a NO magnetic switch (S-2) secured within the tube spaced above the low level magnetic switch, the NO switch being adapted to close responsive to the magnet of the float when the liquid, and with it the float, rises to the particular higher level,
   j. and latching relay means (30) having latching means (37) controlled by the low level switch, and power contacts (39) controlled by the NO magnetic switch the power contacts when closed activating the means (c) aforesaid,
   the latching relay means being constructed and arranged so that the power contacts, having been closed as aforesaid, remain closed until the low level NC magnetic switch is opened by fall of the liquid such that the float resumes the lowest position opening of the NC low level switch unlatching the relay and opening the power contacts; the means to effect latching including,
   k. a low level NO magnetic switch (S-10) adapted to be closed by proximity of the magnet of the magnetic float when the liquid is at a low level,
   l. a signal means (54) in series with the NO magnetic switch across power buses (51, 52),
   m. an electromagnet (55) shunted across the signal means,
   n. a further NO magnetic switch (S-15) adapted to close when the electromagnet is energized, the low level and the further magnetic switches being in parallel,
   constructed and arranged so that when the NO low level switch closes as aforesaid, the signal means energized together with the electromagnet energizing of the electromagnet closing the further magnetic switch so that, notwithstanding the low level switch subsequently opens, the signal means remains energized,
   o. means (S-21) to open the further magnetic switch (S-15) thus effecting latching.

2. Apparatus according to claim 1, the apparatus including,
   iv. an outer tube surrounding the inner tube, the outer tube having upper and lower caps with the inner tube secured to a cap,
   v. means permitting the liquid to enter the outer tube rising therein to a level according to that of liquid outside of the outer tube, the magnetic switches being hermetically sealed within the inner tube.

3. Apparatus according to claim 2, wherein the magnetic float has a buoyant body, the central opening being adapted for the inner tube to pass therethrough, a magnet being secured to the body.

4. Apparatus according to claim 3, the outer and inner tubes extending upwards somewhat past a high danger level (49) of the liquid, a magnetic switch (S-4) adapted to energize a further electric circuit containing a danger signal means, the magnetic switch being positioned to respond to proximity of the magnet of the float as the liquid reaches the danger level, so as to activate the danger signal so long as the liquid remains at or above the danger level.

* * * * *